US009614225B2

(12) United States Patent
Park

(10) Patent No.: US 9,614,225 B2
(45) Date of Patent: Apr. 4, 2017

(54) POSITIVE ACTIVE MATERIAL FOR RECHARGEABLE LITHIUM BATTERY, METHOD FOR PREPARING SAME AND RECHARGEABLE LITHIUM BATTERY INCLUDING SAME

(71) Applicant: SAMSUNG SDI CO., LTD., Yongin-si, Gyeonggi-do (KR)

(72) Inventor: Jung-Joon Park, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 113 days.

(21) Appl. No.: 13/709,852

(22) Filed: Dec. 10, 2012

(65) Prior Publication Data
US 2014/0050993 A1   Feb. 20, 2014

(30) Foreign Application Priority Data

Aug. 14, 2012 (KR) .................. 10-2012-0089137

(51) Int. Cl.
*H01M 6/16* (2006.01)
*H01M 4/525* (2010.01)
(Continued)

(52) U.S. Cl.
CPC ........ *H01M 4/525* (2013.01); *C01G 45/1228* (2013.01); *C01G 51/50* (2013.01);
(Continued)

(58) Field of Classification Search
CPC .... H01M 4/525; H01M 4/505; H01M 10/052; H01M 10/0569; C01P 2002/52;
(Continued)

(56) References Cited

U.S. PATENT DOCUMENTS 6,582,852 B1   6/2003  Gao et al.
6,756,155 B1 * 6/2004  Kweon et al. ........... 429/231.95
(Continued)

FOREIGN PATENT DOCUMENTS

CN   1391297 A   1/2003
CN   1414650 A   4/2003
(Continued)

OTHER PUBLICATIONS

English Machine Translation of Japanese Publication No. 2003-331841, dated Nov. 21, 2003, 19 pages.
(Continued)

*Primary Examiner* — Jonathan Jelsma
*Assistant Examiner* — Omar Kekia
(74) *Attorney, Agent, or Firm* — Lewis Roca Rothgerber Christie LLP

(57) ABSTRACT

A positive active material including a compound represented by $Li_{1+x}M_{1-k}Me_kO_2$. A surface part of a particle of the positive active material has a mole ratio [Me/M] (A) of element represented by Me to element represented by M in $Li_{1+x}M_{1-k}Me_kO_2$ of 0.05≤A≤0.60; the entire particle has a mole ratio [Me/M] (B) of element represented by Me to element represented by M in $Li_{1+x}M_{1-k}Me_kO_2$ of 0.003≤B≤0.012; and element represented by Me has a concentration difference of between two positions of less than or equal to about 0.02 wt % in an inner part of the particle.
In $Li_{1+x}M_{1-k}Me_kO_2$, −0.2≤x≤0.2, 0<k≤0.05
M is one selected from Ni, Mn, Co, and a combination thereof, Me is one selected from Al, Mg, Ti, Zr, B, Ni, Mn, and a combination thereof, and M is not the same element as Me or does not include the same element as Me.

19 Claims, 6 Drawing Sheets

(51) Int. Cl.
*C01G 45/12* (2006.01)
*C01G 51/00* (2006.01)
*H01M 4/505* (2010.01)
*H01M 10/0569* (2010.01)
*C01G 53/00* (2006.01)
*H01M 4/36* (2006.01)
*H01M 10/052* (2010.01)

(52) U.S. Cl.
CPC ............ *C01G 53/50* (2013.01); *H01M 4/366* (2013.01); *H01M 4/505* (2013.01); *H01M 10/0569* (2013.01); *C01P 2002/52* (2013.01); *C01P 2002/54* (2013.01); *C01P 2002/85* (2013.01); *C01P 2004/03* (2013.01); *C01P 2004/61* (2013.01); *C01P 2004/84* (2013.01); *H01M 10/052* (2013.01); *Y02E 60/122* (2013.01)

(58) Field of Classification Search
CPC .............. C01P 2004/84; C01P 2004/03; C01P 2004/61; C01P 2002/85; C01P 2002/54; C01G 51/50; C01G 45/1228; C01G 53/50; Y02E 60/122
USPC ............ 429/223, 224, 231.6, 231.5, 231.95, 429/231.1, 231.3, 341, 342; 252/182.1
See application file for complete search history.

(56) References Cited

U.S. PATENT DOCUMENTS

| | | | |
|---|---|---|---|
| 6,916,580 B2 | 7/2005 | Cho et al. | |
| 7,364,793 B2 | 4/2008 | Paulsen et al. | |
| 2001/0016285 A1 | 8/2001 | Cho et al. | |
| 2003/0031930 A1* | 2/2003 | Hamano | H01M 4/131 429/231.3 |
| 2003/0087155 A1* | 5/2003 | Cho | H01M 4/366 429/231.95 |
| 2005/0106463 A1* | 5/2005 | Kikuchi et al. | 429/231.1 |
| 2008/0248391 A1 | 10/2008 | Wakasugi et al. | |
| 2011/0059367 A1 | 3/2011 | Morita et al. | |
| 2012/0273737 A1 | 11/2012 | Ooishi | |
| 2013/0183583 A1 | 7/2013 | Kim et al. | |
| 2013/0244113 A1 | 9/2013 | Li et al. | |

FOREIGN PATENT DOCUMENTS

| | | |
|---|---|---|
| CN | 101223660 A | 7/2008 |
| CN | 102054985 A | 5/2011 |
| CN | 102576872 A | 7/2012 |
| JP | 2001-243948 | 9/2001 |
| JP | 2003-331841 A | 11/2003 |
| JP | 2004-006277 A | 1/2004 |
| JP | 2010-044963 A | 2/2010 |
| KR | 10-0399642 | 9/2003 |
| KR | 10-0694658 | 3/2007 |
| KR | 10-0812547 B1 | 3/2008 |
| KR | 10-2011-0027617 | 3/2011 |
| WO | WO 2011/043296 A1 | 4/2011 |
| WO | WO 2012/011785 A2 | 1/2012 |

OTHER PUBLICATIONS

European Search Report for Patent Application No. 13160783.0, dated Dec. 17, 2013, 8 pages.
KIPO Office action dated Jan. 29, 2016, for Korean priority Patent application 10-2012-0089137, (7 pages).
Liu, et al., "A comparative study of $LiNi_{0.8}Co_{0.2}O_2$ cathode materials modified by lattice-doping and surface-coating," Solid State Ionics, vol. 166, 2004, pp. 317-325.
SIPO Office Action dated Jul. 4, 2016, with English Translation, for corresponding Chinese Patent Application No. 201310047994.8 (30 pages).
KIPO Notice of Allowance dated Jul. 29, 2016, for corresponding Korean Patent Application No. 10-2012-0089137 (2 pages).

* cited by examiner

POSITIVE ACTIVE MATERIAL FOR RECHARGEABLE LITHIUM BATTERY, METHOD FOR PREPARING SAME AND RECHARGEABLE LITHIUM BATTERY INCLUDING SAME

RELATED APPLICATIONS

This application claims priority to and the benefit of Korean Patent Application No. 10-2012-0089137 filed in the Korean Intellectual Property Office on Aug. 14, 2012, the entire content of which is incorporated herein by reference.

BACKGROUND

1. Field

A positive active material for a rechargeable lithium battery, a method of preparing the same, and a rechargeable lithium battery including the same are disclosed.

2. Description of the Related Art

Relating to the trends of down-sizing and making light weight portable electronic devices, batteries for powering these portable electronic devices should be made to have high performances and high capacities.

Batteries generate electric power using an electrochemical reaction material (referred to hereinafter simply as an "active material") for a positive electrode and a negative electrode. Rechargeable lithium batteries generate electrical energy from changes of chemical potential during the intercalation/deintercalation of lithium ions at the positive and negative electrodes.

Rechargeable lithium batteries use materials that reversibly intercalate or deintercalate lithium ions during charge and discharge reactions for both positive and negative active materials, and include an organic electrolyte or a polymer electrolyte between the positive electrode and the negative electrode.

In a positive active material for a rechargeable lithium battery, lithium composite metal oxides such as $LiCoO_2$, $LiMn_2O_4$, $LiNiO_2$, $LiNi_{1-x}Co_xO_2$ (0<x<1), $LiMnO_2$, $LiNi_{1-x-y}Co_xMn_yO_2$ (0<x<1, 1<y<1), and the like have been researched.

SUMMARY

An aspect of an embodiment is directed toward a positive active material for a rechargeable lithium battery that is capable of improving capacity and cycle-life characteristics of the rechargeable lithium battery.

An aspect of an embodiment is directed toward a method of preparing the positive active material.

An aspect of an embodiment is directed toward a rechargeable lithium battery including the positive active material.

According to one embodiment, a positive active material including a compound represented by the following Chemical Formula 1 is provided.

In a surface part of a particle of the positive active material, a mole ratio [Me/M] (A) of element represented by Me to element represented by M in the following Chemical Formula 1 is 0.05≤A≤0.60, and in the entire particle, a mole ratio [Me/M] (B) of element represented by Me to element represented by M in the following Chemical Formula 1 is 0.003≤B≤0.012.

In an inner part of the particle, element represented by Me has a concentration difference of between two positions of less than or equal to about 0.02 wt %.

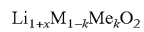
$Li_{1+x}M_{1-k}Me_kO_2$     [Chemical Formula 1]

−0.2≤x≤0.2, 0<k≤0.05

M is one selected from Ni, Mn, Co, and a combination thereof,

Me is one selected from Al, Mg, Ti, Zr, B, Ni, Mn, and a combination thereof, and M is not the same element as Me or does not include the same element as Me.

A/B may be 10≤A/B≤100.

The surface part and the inner part are partitioned by an interface positioned in a depth identical from the surface of the particle to the center of the particle, and the surface part is designated as from the surface of the particle to the interface, and the inner part is designated as the inside of the interface. The interface may be disposed in the depth of about 3 nm to about 10 nm from the surface of the particle to the center of the particle.

The element represented by Me may have a decreasing concentration gradient as going from the surface of the particle to the center of the particle.

In the inner part of the positive active material particle, the element represented by Me in Chemical Formula 1 may have a concentration of about 0.01 wt % to about 0.50 wt %.

In one embodiment, in the above Chemical Formula 1, M may be Co.

The positive active material may have an average particle diameter of about 5 μm to about 20 μm.

According to another embodiment, provided is a rechargeable lithium battery that includes a positive electrode including the positive active material; a negative electrode including a negative active material; and a non-aqueous electrolyte.

The negative active material may be a material that reversibly intercalates and deintercalates lithium ions, a lithium metal, a lithium metal alloy, a material being capable of doping and dedoping lithium, or a transition metal oxide.

The non-aqueous electrolyte may include a non-aqueous organic solvent selected from a carbonate-based, ester-based, ether-based, ketone-based, alcohol-based and aprotic solvent, and a combination thereof.

According to yet another embodiment, a method of preparing a positive active material for a rechargeable lithium battery including the compound represented by the following Chemical formula 1 is provided that includes mixing a Li raw material, a raw material of element represented by M (wherein M is one selected from Ni, Mn, Co, and a combination thereof), and a raw material of element represented by $Me^1$ (wherein $Me^1$ is one selected from Al, Mg, Ti, Zr, B, Ni, Mn, and a combination thereof) and firing the same to provide a primary particle of compound including Li, M, and $Me^1$; and coating the primary particle with a raw material of element represented by $Me^2$ (wherein $Me^2$ is one selected from Al, Mg, Ti, Zr, B, Ni, Mn, and a combination thereof) and firing the same to provide a secondary particle of compound including Li, M and $Me^1$, and $Me^2$.

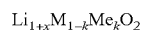
$Li_{1+x}M_{1-k}Me_kO_2$     [Chemical Formula 1]

−0.2≤x≤0.2, 0<k≤0.05

M is one selected from Ni, Mn, Co, and a combination thereof,

Me is one selected from Al, Mg, Ti, Zr, B, Ni, Mn, and a combination thereof, and M is not the same element as Me or does not include the same element as Me.

In view of the above and according to one embodiment, the rechargeable lithium battery has improved capacity and cycle-life characteristics.

DETAILED DESCRIPTION

Figure 1:
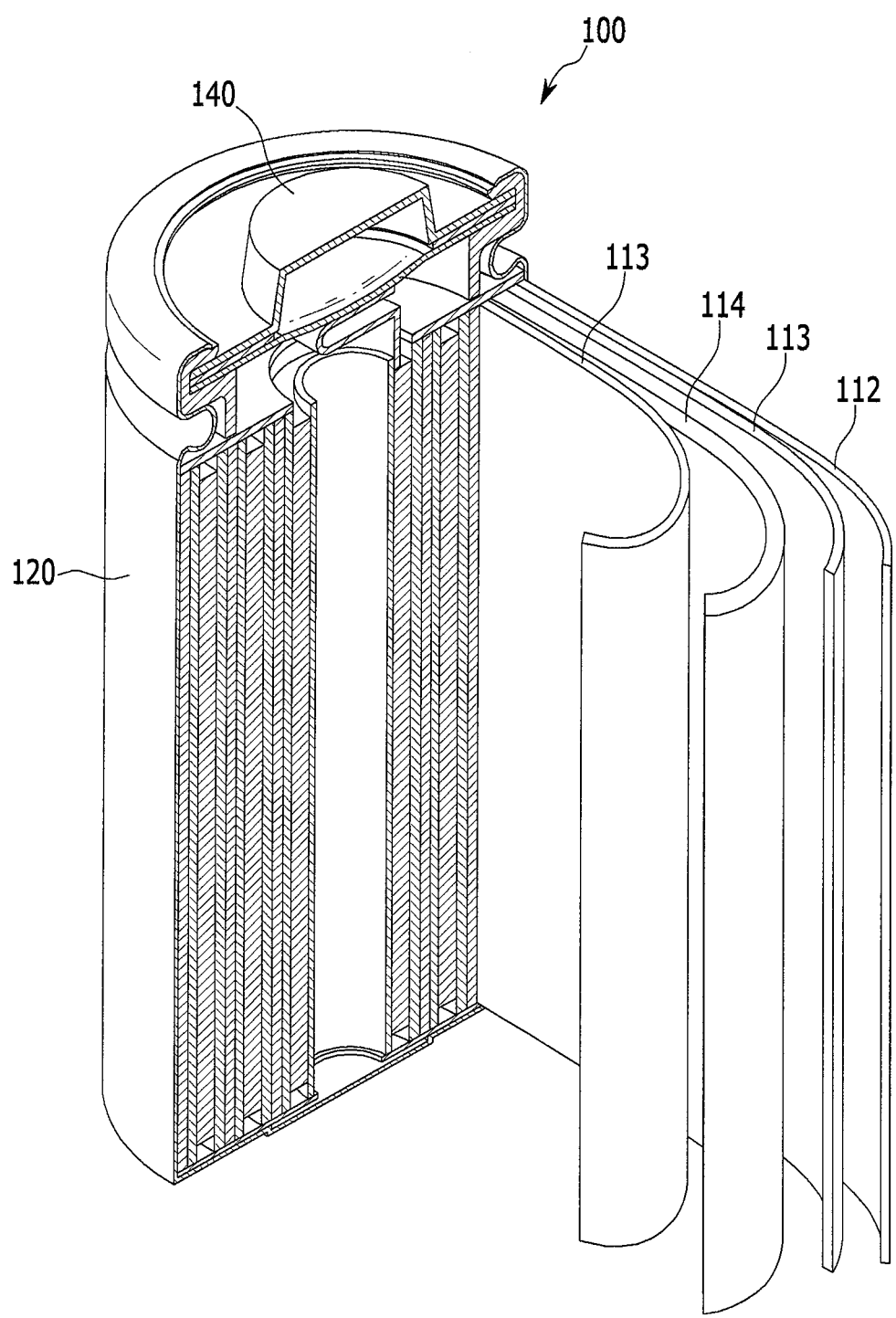
FIG. 1 is a schematic view showing the structure of a rechargeable lithium battery according to one embodiment of the present invention.

Exemplary embodiments of the present invention will hereinafter be described in detail. However, these embodiments are only exemplary, and the present invention is not limited thereto.

According to one embodiment, a positive active material including a compound represented by the following Chemical Formula 1 for a rechargeable lithium battery is provided.

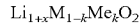

[Chemical Formula 1]

$-0.2 \leq x \leq 0.2$, $0 < k \leq 0.05$

M is one selected from Ni, Mn, Co, and a combination thereof,

Me is one selected from Al, Mg, Ti, Zr, B, Ni, Mn, and a combination thereof, and M is not the same element as Me or does not include the same element as Me.

The positive active material has a higher concentration of the element represented by Me in the surface part than in the inner part. For example, when the mole ratio [Me/M] of the element represented by Me to the element represented by M in Chemical Formula 1 refers to A in the surface part of a particle of the positive active material, A may be $0.05 \leq A \leq 0.60$; and when the mole ratio [Me/M] of the element represented by Me to the element represented by M in Chemical Formula 1 refers to B in the entire particle of the positive active material, B may be $0.003 \leq B \leq 0.012$.

Each element represented by Me is distributed in the inner part of the particle at a relatively uniform concentration. For example, a certain one element represented by Me in Chemical Formula 1 has a concentration difference of between set or predetermined two positions of less than or equal to about 0.02 wt %.

The inner part and the surface part are partitioned by the interface (e.g., the dashed line shown in FIG. 2A) positioned in a depth identical from the surface of the particle to the center, and the surface part is defined as from the surface of the particle to the interface, and the inner part is defined as the inside from the interface (e.g., from the interface to the center). The interface may be positioned in the depth of about 3 nm to about 10 nm from the surface of the particle to the center thereof. For example, the interface may be a surface present in the depth of about 5 nm from the surface of the particle to the center.

The concentration of the surface part of the particle may be measured for each element by X-ray Photoelectron Spectroscopy (XPS), so the value of A may be calculated therefrom.

In order to measure the concentration based on the entire one particle, it may be measured by Inductively Coupled Plasma—Atomic Emission Spectrometer (ICP-AES), and the value of B may be calculated therefrom.

The positive active material may have A/B of $10 \leq A/B \leq 100$. For example, A/B may be $25 \leq A/B \leq 70$, specifically, $30 \leq A/B \leq 50$. In one embodiment, when having the concentration gradient to provide A/B within the range, the rechargeable lithium battery having the composition has remarkably improved cycle-life characteristics.

In one embodiment, the positive active material may include the element represented by Me in a high concentration in the surface part of the particle and also have a concentration gradient with decreasing concentration as going to the center part. In this case, the inner part may maintain a set or predetermined level of concentration. For example, in the inner part of the positive active material particle, the element represented by Me in Chemical Formula 1 may have a concentration of about 0.01 wt % to about 0.50 wt %, specifically, about 0.05 wt % to about 0.30 wt %.

According to another embodiment, the positive active material, may be a lithium cobalt-based composite oxide in which the element represented by M is Co.

The positive active material may have an average particle diameter of about 5 μm to about 20 μm.

Hereinafter, a method of preparing the positive active material is described.

According to another embodiment of the present invention, a method of preparing a positive active material for a rechargeable lithium battery is provided that includes mixing a raw material of Li, a raw material of element represented by M (wherein M is one selected from Ni, Mn, Co, and a combination thereof), and a raw material of element represented by $Me^1$ (wherein $Me^1$ is one selected from Al, Mg, Ti, Zr, B, Ni, Mn, and a combination thereof) and heat treating (firing) the same to provide primary particle of compound including Li, M, and $Me^1$; and coating a raw material of element represented by $Me^2$ (wherein $Me^2$ is one selected from Al, Mg, Ti, Zr, B, Ni, Mn, and a combination thereof) on the primary particle and heat treating (firing) the same to provide a secondary particle of compound including Li, M, $Me^1$ and $Me^2$.

The Li raw material may include lithium phosphate ($Li_3PO_4$), lithium nitrate ($LiNO_3$), lithium acetate ($LiCH_3COOH$), lithium carbonate ($Li_2CO_3$), lithium hydroxide (LiOH), lithium dihydrogen phosphate ($LiH_2PO_4$), or a combination thereof, but is not limited thereto.

The raw material of element represented by M may include oxide, sulfate, nitrate, acetate, hydroxide, chloride, oxalate, fluoride, carbonate, or a combination thereof of element represented by M, but is not limited thereto.

The raw materials represented by $Me^1$ and $Me^2$ may include oxide, sulfate, nitrate, acetate, hydroxide, chloride, oxalate, fluoride, carbonate, or a combination thereof of the elements represented by $Me^1$ and $Me^2$, but is not limited thereto.

A Li raw material, a raw material of element represented by M, and a raw material of element represented by $Me^1$ are mixed and fired to provide a primary particle of compound including Li, M, and $Me^1$; and then mixed with a raw material of element represented by $Me^2$ (wherein $Me^2$ is one selected from Al, Mg, Ti, Zr, B, Ni, Mn, and a combination thereof) to increase the concentration thereof in a surface part of the positive active material particle and fired to provide a secondary particle of compound including Li, M and Me$^1$ and Me$^2$ in which the element represented by Me$^2$ is present in a high concentration in the surface part of the particle. Me$^1$ and Me$^2$ may be the same.

During the providing of the primary particle, the firing may be performed at about 950° C. to about 1100° C. for about 10 hours to about 30 hours; and during the providing of the secondary particle, the firing may be performed at about 600° C. to about 1000° C. for about 10 hours to about 30 hours.

According to another embodiment, provided is a rechargeable lithium battery that includes a positive electrode including the positive active material; a negative electrode including a negative active material; and a non-aqueous electrolyte.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, coin-type, or pouch-type batteries, and may be thin film batteries or may be rather bulky in size. Structures and fabricating methods for lithium ion batteries pertaining to this disclosure are well known in the art.

FIG. 1 is an exploded perspective view of a rechargeable lithium battery according to one embodiment. Referring to FIG. 1, the rechargeable lithium battery 100 according to one embodiment includes a battery cell including a positive electrode 114, a negative electrode 112 facing the positive electrode 114, a separator 113 interposed between the positive electrode 114 and the negative electrode 112, and an electrolyte impregnating the positive electrode 114, negative electrode 112, and separator 113, a battery case 120 housing the battery cell, and a sealing member 140 sealing the battery case 120. The rechargeable lithium battery 100 is fabricated by sequentially stacking a negative electrode 112, a positive electrode 114, and separator 113, and spiral-winding them and housing the wound product in the battery case 120.

The negative electrode includes a current collector and a negative active material layer formed over the current collector, and the negative active material layer includes a negative active material.

The negative active material layer includes a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions includes a carbon material. The carbon material may be any generally-used carbon-based negative active material in a lithium ion rechargeable battery. Examples of the carbon material include crystalline carbon, amorphous carbon, and a mixture thereof. The crystalline carbon may be non-shaped or sheet, flake, spherical, or fiber shaped natural graphite or artificial graphite. The amorphous carbon may be a soft carbon, a hard carbon, mesophase pitch carbide, fired coke, or the like.

The lithium metal alloy includes lithium and a metal selected from Na, K, Rb, Cs, Fr, Be, Mg, Ca, Sr, Si, Sb, Pb, In, Zn, Ba, Ra, Ge, Al, or Sn.

The material being capable of doping and dedoping lithium may include Si, SiO$_x$ (0<x<2), a Si—C composite, a Si-Q alloy (wherein is an element selected from an alkali metal, an alkaline-earth metal, Group 13 to 16 elements, a transition element, a rare earth element, or a combination thereof, and not Si), Sn, SnO$_2$, a Sn—C composite, a Sn—R alloy (wherein R is selected from an alkali metal, an alkaline-earth metal, Group 13 to 16 elements, a transition element, a rare earth element, or a combination thereof, and not Sn), and the like. At least one of these materials may be mixed with SiO$_2$. The elements Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include vanadium oxide, lithium vanadium oxide, or the like.

The negative active material layer includes a binder, and optionally a conductive material.

The binder improves properties of binding negative active material particles with one another and the negative active materials with a current collector. The binder includes polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but is not limited thereto.

The conductive material is used to provide conductivity to an electrode. The conductive material may be any electrically conductive material that is used as a conductive material unless it causes a chemical change. Examples of the conductive material include a carbon-based material such as natural graphite, artificial graphite, carbon black, acetylene black, ketjen black, a carbon fiber or the like; a metal-based material of metal powder or metal fiber including copper, nickel, aluminum, silver, or the like; a conductive polymer such as polyphenylene derivatives; or a mixture thereof.

The current collector may be a copper foil, a nickel foil, a stainless steel foil, a titanium foil, a nickel foam, a copper foam, a polymer substrate coated with a conductive metal, or a combination thereof.

The positive electrode includes a current collector and a positive active material layer disposed on the current collector.

The positive active material is the same as described above.

The positive active material layer may include a binder and a conductive material.

The binder improves binding properties of the positive active material particles to each other and to a current collector. Examples of the binder include polyvinylalcohol, carboxylmethylcellulose, hydroxypropylcellulose, acetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is used to provide conductivity to an electrode. In the battery including the same, it may include any suitable electronic conductive material causing no or insignificant chemical change. For example, it may include natural graphite, artificial graphite, carbon black, acetylene black, ketjen black, a carbon fiber, a metal powder or a metal fiber or the like such as copper, nickel, aluminum, silver or the like, or one or at least one kind of mixture of conductive material such as polyphenylene derivative or the like.

The current collector may be Al, but is not limited thereto.

The negative and positive electrodes may be fabricated by a method including mixing the active material, a conductive material, and a binder into an active material composition, and coating the composition on a current collector, respectively. The electrode manufacturing method is well known, and thus is not described in detail in the present specification. The solvent includes N-methylpyrrolidone and the like, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, methylpropinonate, ethylpropinonate, γ-butyrolactone, decanolide, valerolactone, mevalonolactone, caprolactone, or the like. The ether-based solvent includes dibutyl ether, tetraglyme, diglyme, dimethoxyethane, 2-methyltetrahydrofuran, tetrahydrofuran, or the like, and the ketone-based solvent include cyclohexanone, or the like. The alcohol-based solvents include ethyl alcohol, isopropyl alcohol, and the like, and the aprotic solvents include nitriles such as R—CN (wherein R is a C2 to C20 linear, branched, or cyclic hydrocarbon group including a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, the mixture ratio can be controlled in accordance with a desirable battery performance.

The carbonate-based solvent is prepared by mixing a cyclic carbonate and a linear carbonate. The cyclic carbonate and the linear carbonate are mixed together in the volume ratio of about 1:1 to about 1:9. Within this range, performance of electrolyte may be improved.

In addition, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be represented by the following Chemical Formula A.

[Chemical Formula A]

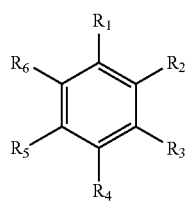

In Chemical Formula A, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate, or an ethylene carbonate-based compound represented by the following Chemical Formula B to improve cycle-life.

[Chemical Formula B]

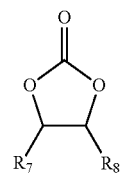

In Chemical Formula B, $R_7$ and $R_8$ are independently selected from hydrogen, hydrogen, a halogen, a cyano group (CN), a nitro group ($NO_2$), and a C1 to C5 fluoroalkyl group, provided that at least one of $R_7$ and $R_8$ is selected from a halogen, a cyano group (CN), a nitro group ($NO_2$), and a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in an organic solvent, supplies lithium ions in a battery, operates a basic operation of the rechargeable lithium battery, and improves lithium ion transportation between positive and negative electrodes therein. Examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, $LiB(C_2O_4)_2$ (lithium bis(oxalato) borate, LiBOB), or a combination thereof, as a supporting electrolytic salt. The lithium salt may be used in a concentration ranging from 0.1 M to 2.0 M. In one embodiment, when the lithium salt is included at the above concentration range, an electrolyte has excellent performance and lithium ion mobility due to desired electrolyte conductivity and viscosity.

The separator 113 may include any suitable materials commonly used in the conventional lithium battery that is capable of separating (e.g., electrically insulating) a negative electrode 112 from a positive electrode 114 and provide a transporting passage for lithium ions. In other words, it may have a low resistance to ion transport and an excellent impregnation for electrolyte. For example, it may be selected from glass fiber, polyester, TEFLON (tetrafluoroethylne), polyethylene, polypropylene, polytetrafluoroethylene (PTFE), or a combination thereof. It may have a form of a non-woven fabric or a woven fabric. For example, for the lithium ion battery, a polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

The following examples illustrate the present invention in more detail. These examples, however, should not in any sense be interpreted as limiting the scope of the present invention.

EXAMPLES

Example 1

Preparation of Positive Active Material 362 g of $Li_2CO_3$ powder, 750 g of $Co_3O_4$ powder, 0.4 g of $TiO_2$ powder, and 2.0 g of $MgCO_3$ powder were mixed and first fired at 1050° C. for 25 hours. The fired powder was pulverized and filtered to provide a $LiCoO_2$ doped with Ti and Mg. The obtained $LiCoO_2$ was mixed with 0.3 g of $TiO_2$ powder and 1.5 g of $MgCO_3$ powder in a dry method and fired at 900° C. for 20 hours and then secondary fired to provide a $LiCoO_2$ powder doped and coated with Ti and Mg.

Example 2

Preparation of Positive Active Material 362 g of $Li_2CO_3$ powder, 750 g of $Co_3O_4$ powder, 1.2 g of $TiO_2$ powder, and 3.0 g of $MgCO_3$ powder were mixed and first fired at 1050° C. for 25 hours. The fired powder was pulverized and filtered to provide a $LiCoO_2$ doped with Ti and Mg. The obtained $LiCoO_2$ was mixed with 1.0 g of $TiO_2$ powder and 2.6 g of $MgCO_3$ powder in a dry method and then secondary fired at 950° C. for 20 hours to provide a $LiCoO_2$ powder doped and coated with Ti and Mg.

Example 3

Preparation of Positive Active Material 362 g of $Li_2CO_3$ powder, 750 g of $Co_3O_4$ powder, 0.9 g of $TiO_2$ powder, and 2.5 g of $MgCO_3$ powder were mixed and first fired at 1050° C. for 25 hours. The fired powder was pulverized and filtered to provide a $LiCoO_2$ doped with Ti and Mg. The obtained $LiCoO_2$ was mixed with 0.7 g of $TiO_2$ powder and 2.3 g of $MgCO_3$ powder in a dry method and then secondary fired at 900° C. for 20 hours to provide a $LiCoO_2$ powder doped and coated with Ti and Mg.

Comparative Example 1

362 g of $Li_2CO_3$ powder and 750 g of $Co_3O_4$ powder were uniform mixed and fired at 950° C. for 25 hours. The fired powder was pulverized and filtered to provide a $LiCoO_2$.

Comparative Example 2

362 g of $Li_2CO_3$ powder, 750 g of $Co_3O_4$ powder, 1.65 g of $TiO_2$ powder, and 4.85 g of $MgCO_3$ powder were mixed and first fired at 1050° C. for 25 hours. The fired powder was pulverized and filtered to provide a $LiCoO_2$ doped with Ti and Mg.

Comparative Example 3

362 g of $Li_2CO_3$ powder and 750 g of $Co_3O_4$ powder were uniform mixed and fired at 950° C. for 25 hours. The fired powder was pulverized and filtered to provide a $LiCoO_2$. The obtained $LiCoO_2$ was mixed with 1.65 g of $TiO_2$ powder and 3.65 g of $MgCO_3$ powder in a dry method and then secondary fired at 900° C. for 20 hours to provide a $LiCoO_2$ powder doped and coated with Ti and Mg.

Comparative Example 4

362 g of $Li_2CO_3$ powder and 750 g of $Co_3O_4$ powder were uniform mixed and fired at 950° C. for 25 hours. The fired powder was pulverized and filtered to provide a $LiCoO_2$. The obtained $LiCoO_2$ was mixed with 1.65 g of $TiO_2$ powder and 4.5 g of $MgCO_3$ powder in a dry method and then secondary fired at 1020° C. for 20 hours to provide a $LiCoO_2$ powder doped and coated with Ti and Mg.

(Evaluation of A/B)

(Measurement of B)

The positive active materials obtained from Examples 1 to 3 and Comparative Examples 2 to 4 were measured for weight ratios (wt %) of components of Co, Ti, and Mg using an Inductively Coupled Plasma-Atomic Emission Spectrometer (ICP-AES), and each weight ratio was divided by the molecular weight of each component to calculate the molar number of each component. Thereby, the ratio (B) of the sum molar number of Ti and Mg to the molar number of Co was calculated as follows:

$B$=(Ti molar number+Mg molar number)÷Co molar number (Measurement of A)

Using an X-ray Photoelectron Spectroscopy (XPS), atomic % (at %) of Co, Ti, and Mg components was analyzed on the surface of the particle and divided by a molecular weight of each component to calculate the component ratio. Then the ratio (A) was calculated by the following formula:

$A$=(Ti at %+Mg at %)÷(Co at %)

The analysis results are shown in the following Table 1.

TABLE 1

|  | Entire analysis of active material (ICP-AES) [wt %] | | | Surface analysis of active material (XPS): [at %] | | |
| --- | --- | --- | --- | --- | --- | --- |
|  | Co | Ti | Mg | Co | Ti | Mg |
| Example 1 | 59.2 | 0.04 | 0.09 | 13.8 | 0.35 | 0.81 |
| Example 2 | 58.5 | 0.122 | 0.138 | 14.0 | 1.4 | 2.3 |
| Example 3 | 58.5 | 0.09 | 0.187 | 13.5 | 1.1 | 4.1 |
| Comparative Example 2 | 59.0 | 0.09 | 0.12 | 0 | 0 | 0 |
| Comparative Example 3 | 58.2 | 0.09 | 0.09 | 9.5 | 7.5 | 6.5 |
| Comparative Example 4 | 58.8 | 0.09 | 0.12 | 12.4 | 0.9 | 2.1 |

A/B was calculated from the results of Table 1 and shown in the following Table 2.

TABLE 2

| | A/B |
|---|---|
| Example 1 | 18.7 |
| Example 2 | 31.8 |
| Example 3 | 40.1 |

Figure 3:
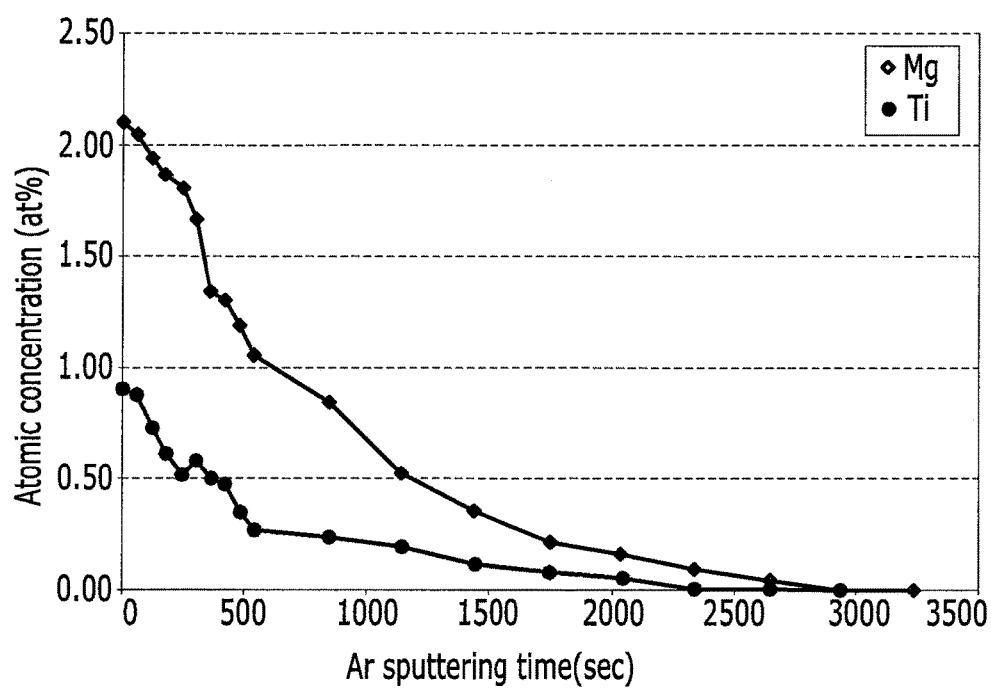
FIG. 3 is a graph showing a concentration of Ti and Mg depending upon a depth of the positive active material particle obtained from Comparative Example 4.

While the surface of positive active material obtained from Comparative Example 4 was sputtered with Ar, the contents (wt %) of Ti and Mg components were XPS analyzed and shown in FIG. 3. The Ar sputtering time shown in FIG. 3 is corresponded to the depth from the surface of the particle, so the graph results of FIG. 3 are considered as the atom concentration (at %) analysis results of Ti and Mg components according to the depth from the surface of the particle to the center. The Ar sputtering intensity indicates the intensity capable of sputtering in a level of about 5 nm per minute, so it is confirmed that dopant was not in (i.e., does not exist in) the depth of about 0.25 μm in a direction of from the surface to the center from the results for 3000 seconds.

Experimental Example 2

Figure 2A:
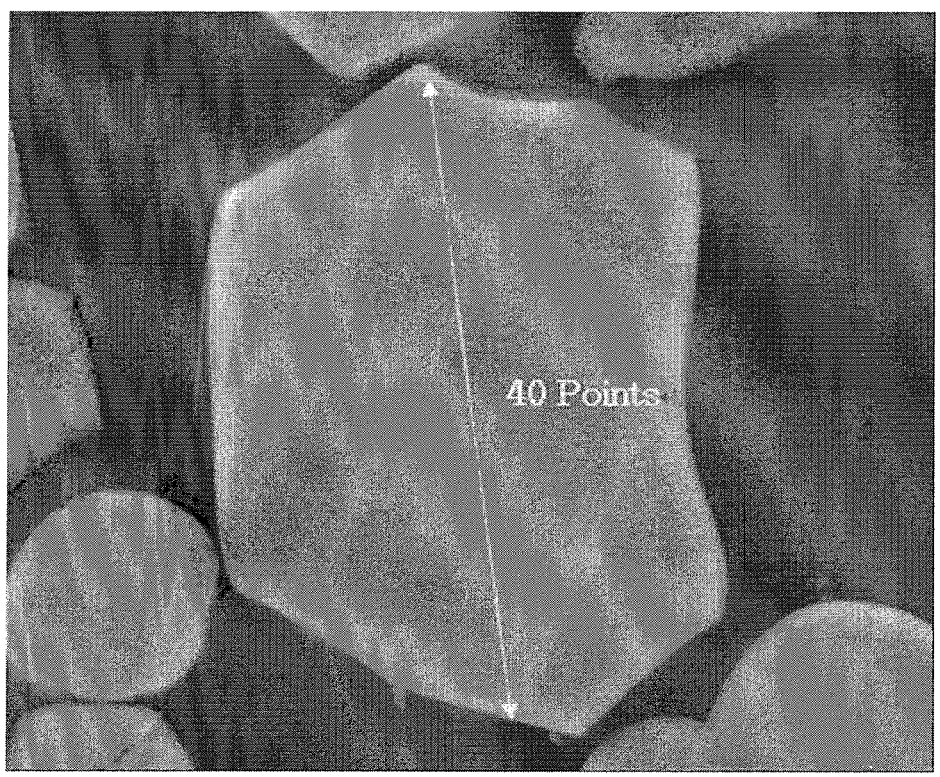
FIG. 2A is a micrograph of a positive active material particle obtained from Example 2.
Figure 2B:
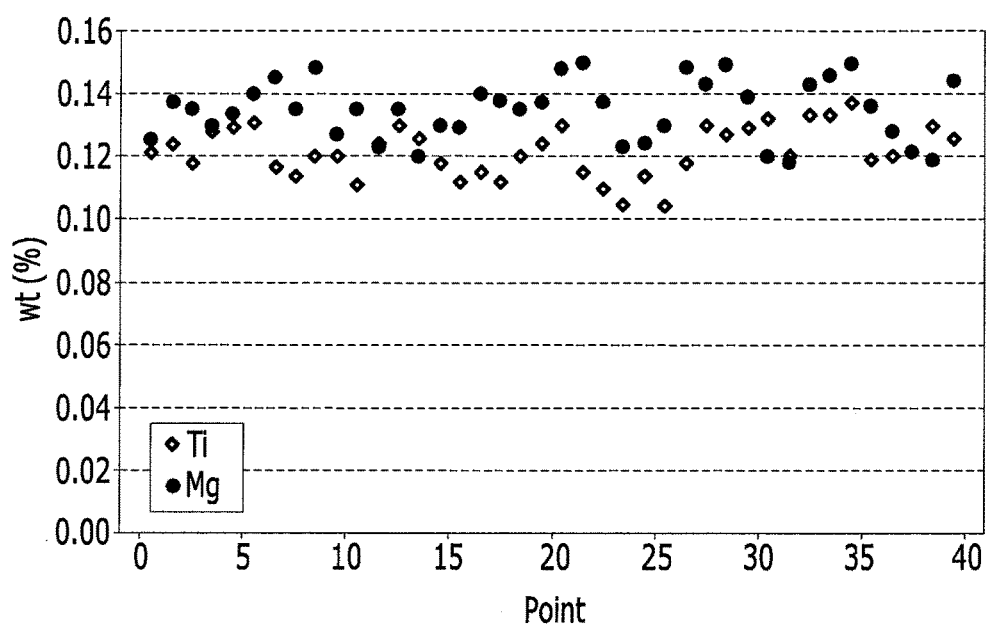
FIG. 2B is a graph showing a concentration of Ti and Mg depending upon a depth of the positive active material particle obtained from Example 2.

The cross-sectional surface of positive active material obtained from Example 2 was observed using a Scanning Electron Microscope-Energy Dispersive Spectrometer (SEM-EDS), and the concentrations of Ti and Mg of the inner part were analyzed. FIG. 2A and FIG. 2B show SEM-EDS analysis results. As shown in FIG. 2A, the diameter of the particle was separated by a set or predetermined gap within 40 points, and the concentration (wt %) at each point was analyzed, and the results are shown in FIG. 2B.

From FIG. 2A, the concentration difference of each Ti and Mg was ±0.02 wt % at the set or predetermined 2 points in the inner part of the particle (i.e., the inner part inside the interface shown by the dashed line), so it is understood that the concentrations of dopants of Ti and Mg were uniform in the inner part.

Example 4

Fabrication of Coin Cell (Fabrication of Positive Electrode)
The positive active material obtained from Example 1, a binder of polyvinylidene fluoride, and a conductive material of carbon black were mixed at a weight ratio of 94:3:3 in a N-methylpyrrolidone solvent to provide a slurry of positive active material layer. The slurry of positive active material layer was coated on a positive electrode current collector of Al foil to provide a thin plate and dried at about 120° C. for 1 hour and pressed to provide a positive electrode including a positive active material layer
(Fabrication of Negative Electrode)
A Li foil was used as a negative active material to provide a negative electrode.
(Fabrication of Battery Cell)
The obtained positive electrode, the negative electrode, a polyethylene separator having a thickness of 20 μm, and an electrolyte solution (a mixture of EC (ethylene carbonate) and EMC (ethylmethyl carbonate) and DMC (dimethyl carbonate) (volume ratio of EM:EMC:DMC:3:3:4)+1.15 M of $LiPF_6$) were assembled to provide a coin cell.

Example 5

Fabrication of Coin Cell

A coin cell was fabricated in accordance with the same procedure as in Example 4, except that the positive active material according to Example 2 was used.

Example 6

Fabrication of Coin Cell

A coin cell was fabricated in accordance with the same procedure as in Example 4, except that the positive active material according to Example 3 was used.

Comparative Example 5

Fabrication of Coin Cell

A coin cell was fabricated in accordance with the same procedure as in Example 4, except that the positive active material according to Comparative Example 1 was used.

Comparative Example 6

Fabrication of Coin Cell

A coin cell was fabricated in accordance with the same procedure as in Example 4, except that the positive active material according to Comparative Example 2 was used.

Comparative Example 7

Fabrication of Coin Cell

A coin cell was fabricated in accordance with the same procedure as in Example 4, except that the positive active material according to Comparative Example 3 was used.

Comparative Example 7

Fabrication of Coin Cell

A coin cell was fabricated in accordance with the same procedure as in Example 4, except that the positive active material according to Comparative Example 4 was used.

Experimental Example 3

Evaluation of Cycle-Life Characteristics

Figure 4:
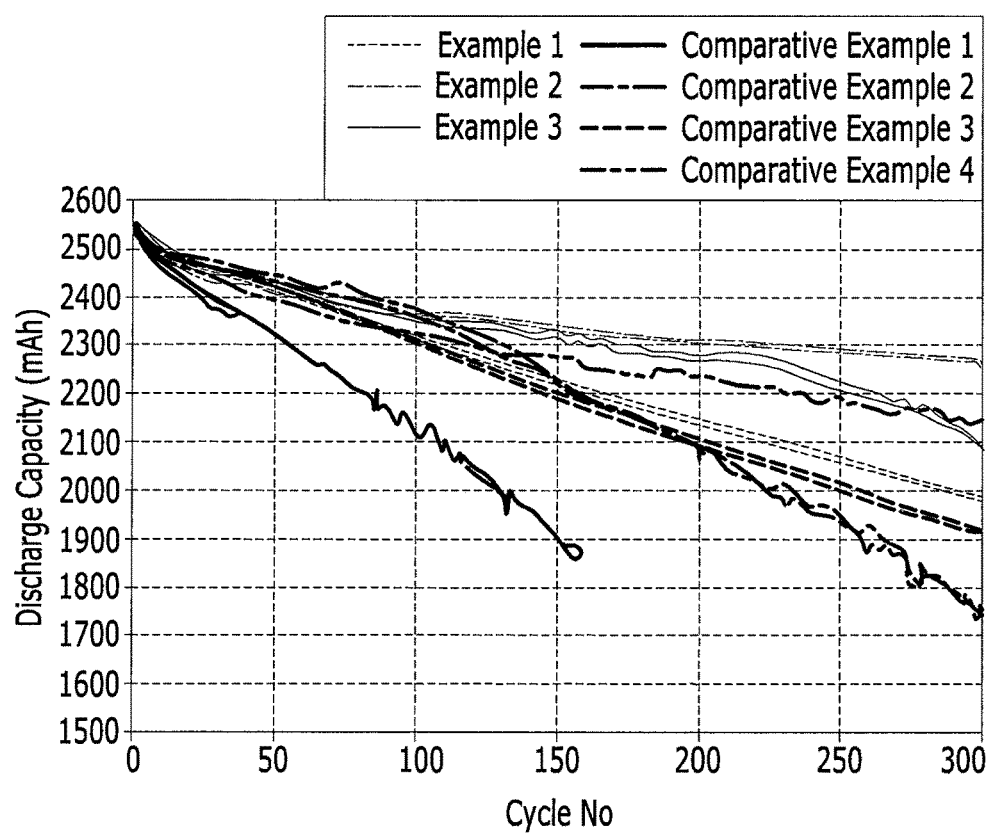
FIG. 4 is a graph showing capacity according to the cycle of rechargeable lithium cells obtained from Examples 1 to 3 and Comparative Examples 1 to 4 to determine cycle-life characteristics.
Figure 5:
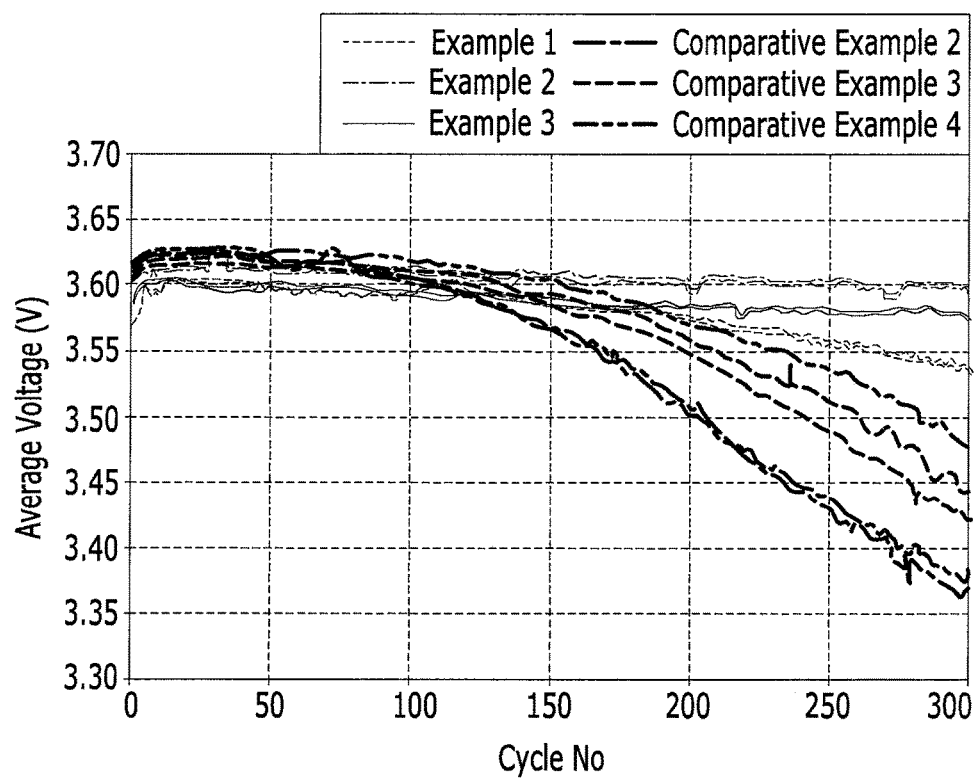
FIG. 5 is a graph showing the average voltage according to the cycle of rechargeable lithium cells obtained from Examples 1 to 3 and Comparative Examples 2 to 4 to determine cycle-life characteristics.

Each rechargeable lithium battery cell obtained from Examples 4 to 6 and Comparative Examples 5 to 8 was charged at a room temperature at cut-off of CC-CV of 0.8 C, 4.2 V, 100 mA and discharged at cut-off of 1.0 C, 3.0 V to set a 1 cycle. It was repeated for 300 cycles to evaluate the cycle-life characteristics. FIG. 4 shows the discharge capacity depending upon the number of cycles, and FIG. 5 shows the average voltage depending upon the number of cycles.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive active material for a rechargeable lithium battery, comprising:
    a compound represented by the following Chemical Formula 1,
    wherein a surface part of a particle of the positive active material has a mole ratio [Me/M] (A) of an element represented by Me to an element represented by M in the following Chemical Formula 1 of 0.05≤A≤0.60;
    wherein the surface part and an inner part are partitioned by an interface at which the surface part and the inner part contact one another;
    wherein the surface part is designated as the portion of the particle from the surface of the particle to the interface, and the inner part is designated as the portion of the particle inside of the interface;
    wherein the interface is positioned at a depth of about 3 nm to about 5 nm from the surface of the particle to the center of the particle;
    wherein the entire particle has a mole ratio [Me/M] (B) of the element represented by Me to the element represented by M in the following Chemical Formula 1 of 0.003≤B≤0.012; and
    wherein the element represented by Me has a concentration difference of between two positions of less than or equal to about 0.02 wt % in the inner part of the particle, $$Li_{1+x}M_{1-k}Me_kO_2 \quad \text{[Chemical Formula 1]}$$

wherein, −0.2≤x≤0.2, 0<k≤0.05
    M is one selected from Ni, Mn, Co, and a combination thereof,
    Me is Ti and one selected from Al, Mg, Zr, Ni, Mn, and a combination thereof, and
    M is not the same element as Me or does not comprise the same element as Me.

2. The positive active material of claim 1, wherein A/B is 10≤A/B≤100.

3. The positive active material of claim 1, wherein the element represented by Me has a concentration gradient decreasing from the surface of the particle to the center of the particle.

4. The positive active material of claim 1, wherein the element represented by Me in Chemical Formula 1 has a concentration of about 0.01 wt % to about 0.50 wt % in the inner part of the particle.

5. The positive active material of claim 1, wherein in the above Chemical Formula 1, M is Co.

6. The positive active material of claim 1, wherein the positive active material has an average particle diameter of about 5 μm to about 20 μm.

7. The positive active material of claim 1, wherein the depth is identical from the surface of the particle to the center of the particle.

8. A rechargeable lithium battery, comprising
    a positive electrode comprising a positive active material;
    a negative electrode comprising a negative active material; and
    a non-aqueous electrolyte,
    wherein the positive active material comprises a compound represented by the following Chemical Formula 1,
    wherein a surface part of a particle of the positive active material has a mole ratio [Me/M] (A) of an element represented by Me to an element represented by M in the following Chemical Formula 1 of 0.05≤A≤0.60;
    wherein the surface part and an inner part are partitioned by an interface at which the surface part and the inner part contact one another;
    wherein the surface part is designated as the portion of the particle from the surface of the particle to the interface, and the inner part is designated as the portion of the particle inside of the interface;
    wherein the interface is positioned at a depth of about 3 nm to about 5 nm from the surface of the particle to the center of the particle;
    wherein the entire particle has a mole ratio [Me/M] (B) of the element represented by Me to the element represented by M in the following Chemical Formula 1 of 0.003≤B≤0.012; and
    wherein the element represented by Me has a concentration difference of between two positions of less than or equal to about 0.02 wt % in the inner part of the particle, $$Li_{1+x}M_{1-k}Me_kO_2 \quad \text{[Chemical Formula 1]}$$

wherein, −0.25≤x≤0.2, 0<k≤0.05
    M is one selected from Ni, Mn, Co, and a combination thereof,
    Me is Ti and one selected from Al, Mg, Zr, Ni, Mn, and a combination thereof, and
    M is not the same element as Me or does not comprise the same element as Me.

9. The rechargeable lithium battery of claim 8, wherein the negative active material is a material for reversibly intercalating and deintercalating lithium ions, a lithium metal, a lithium metal alloy, a material for doping and dedoping lithium, or a transition, metal oxide.

10. The rechargeable lithium battery of claim 8, wherein the non-aqueous electrolyte comprises a non-aqueous organic solvent selected from a carbonate-based, ester-based, ether-based, ketone-based, alcohol-based and aprotic solvent, and a combination thereof.

11. The rechargeable lithium battery of claim 8, wherein A/B is 10≤A/B≤100.

12. The rechargeable lithium battery of claim 8, wherein the element represented by Me has a concentration gradient decreasing from the surface of the particle to the center of the particle.

13. The rechargeable lithium battery of claim 8, wherein the element represented by Me in Chemical Formula 1 has a concentration of about 0.01 wt % to about 0.50 wt % in the inner part of the particle.

14. The rechargeable lithium battery of claim 8, wherein in the above Chemical Formula 1, M is Co.

15. The rechargeable lithium battery of claim 8, wherein the positive active material has an average particle diameter of about 5 μm to about 20 μm.

16. The rechargeable lithium battery of claim 8, wherein the depth is identical from the surface of the particle to the center of the particle.

17. A method of preparing a positive active material for a rechargeable lithium battery comprising a compound represented by the following chemical Formula 1, the method comprising:
    mixing a Li raw material, a raw material of an element represented by M, wherein M is one selected from Ni, Mn, Co, and a combination thereof, and a raw material of an element represented by Me$^1$, wherein Me$^1$ is one selected from Al, Mg, Ti, Zr, Ni, Mn, and a combination thereof, and firing the same to provide a primary particle comprising Li, M, and Me$^1$; and coating the primary particle with a raw material of an element represented by $Me^2$, wherein $Me^2$ is one selected from Al, Mg, Ti, Zr, Ni, Mn, and a combination thereof, and firing the same to provide a secondary particle comprising Li, M and $Me^1$ and $Me^2$, $$Li_{1+x}M_{1-k}Me_kO_2 \quad \text{[Chemical Formula 1]}$$

$-0.2 \leq x \leq 0.2$, $0 < k \leq 0.05$ wherein M is one selected from Ni, Mn, Co, and a combination thereof, Me is one selected from Al, Mg, Ti, Zr, Ni, Mn, and a combination thereof, M is not the same element as Me or does not comprise the same element as Me, wherein a surface part of a particle of the positive active material has a mole ratio [Me/M] (A) of the element represented by Me to the element represented by M in the following Chemical Formula 1 of $0.05 \leq A \leq 0.60$;

wherein the surface part and an inner part are partitioned by an interface at which the surface part and the inner part contact one another;

wherein the surface part is designated as the portion of the particle from the surface of the particle to the interface, and the inner part is designated as the portion of the particle inside of the interface;

wherein the interface is positioned at a depth of about 3 nm to about 5 nm from the surface of the particle to the center of the particle;

wherein the entire particle has a mole ratio [Me/M](B) of the element represented by Me to the element represented by M in the following Chemical Formula 1 of $0.003 \leq B \leq 0.012$; and wherein the element represented by Me has a concentration difference of between two positions of less than or equal to about 0.02 wt % in the inner part of the particle.

18. The method of claim 17, wherein the firing to provide the secondary particle comprises mixing the primary particle with the raw material of the element represented by $Me^2$ and firing at about 600 to about 1000° C. for about 10 hours to about 30 hours.

19. The method of claim 17, wherein the firing to provide the primary particle comprises firing at about 950° C. to about 1100° C. for about 10 hours to about 30 hours.

* * * * *